(12) United States Patent
Langerbeins et al.

(10) Patent No.: US 8,466,245 B2
(45) Date of Patent: *Jun. 18, 2013

(54) POLYMERISABLE MASS WITH CROSS-LINKING NANOPARTICLES

(75) Inventors: Klaus Langerbeins, Geesthacht (DE); Uwe Dietrich Kühner, Hamburg (DE); Werner Siol, Darmstadt (DE)

(73) Assignee: Nanoresins AG, Geesthacht (DE)

( * ) Notice: Subject to any disclaimer, the term of this patent is extended or adjusted under 35 U.S.C. 154(b) by 218 days.

This patent is subject to a terminal disclaimer.

(21) Appl. No.: 12/988,260

(22) PCT Filed: Apr. 20, 2009

(86) PCT No.: PCT/EP2009/002855
§ 371 (c)(1),
(2), (4) Date: Jan. 7, 2011

(87) PCT Pub. No.: WO2009/127434
PCT Pub. Date: Oct. 22, 2009

(65) Prior Publication Data
US 2011/0112251 A1    May 12, 2011

(30) Foreign Application Priority Data

Apr. 18, 2008 (EP) .................................. 08007581

(51) Int. Cl.
*C08F 118/02* (2006.01)
*C08F 230/08* (2006.01)
*B82Y 30/00* (2011.01)

(52) U.S. Cl.
USPC .......................... 526/319; 526/279; 977/773

(58) Field of Classification Search
USPC ............ 526/262, 279, 319; 524/494; 977/773
See application file for complete search history.

(56) References Cited

U.S. PATENT DOCUMENTS

| | | | | |
|---|---|---|---|---|
| 2,801,185 A | * | 7/1957 | Iler | 106/490 |
| 5,965,299 A | * | 10/1999 | Khan et al. | 429/313 |
| 6,299,799 B1 | * | 10/2001 | Craig et al. | 252/500 |
| 7,396,612 B2 | * | 7/2008 | Ohata et al. | 429/134 |

FOREIGN PATENT DOCUMENTS

| | | |
|---|---|---|
| EP | 0505230 | 9/1992 |
| EP | 505230 A1 * | 9/1992 |
| WO | 9859388 | 12/1998 |
| WO | 0073393 | 12/2000 |

* cited by examiner

Primary Examiner — Michael M Bernshteyn
(74) Attorney, Agent, or Firm — Casimir Jones, S.C.

(57) ABSTRACT

The invention relates to a polymerizable composition containing:
a) acrylates and/or methacrylates which have a glass transition temperature $T_g$ of 0° C. or less,
b) from 0.5 to 70% by weight of $SiO_2$ particles which have an average particle size of from 1 to 150 nm and have polymerizable groups on the surface and are present in dispersed form in the acrylates and/or methacrylates, with at least 50% of the $SiO_2$ particles being individual unaggregated or unagglomerated primary particles,
where the composition contains not more than 2% by weight of crosslinker molecules.

37 Claims, No Drawings

POLYMERISABLE MASS WITH CROSS-LINKING NANOPARTICLES

This application is a §371 U.S. National Entry of International Application No. PCT/EP2009/002855, filed Apr. 20, 2009, which claims the benefit of European Application No. 08007581.5, filed Apr. 18, 2008, each of which is incorporated herein by reference in its entirety.

The invention relates to a polymerizable composition based on acrylates and/or methacrylates and also polymeric materials produced using such a composition.

Polyacrylates and polymethacrylates have long been known in the prior art. They are used, for example, for producing Plexiglas or acrylate rubbers.

Pure crosslinked polyacrylates have only a comparatively low strength. The mechanical properties of polymers can be improved by means of fillers. Owing to the comparative ease with which acrylate ester groups can be hydrolysed, only a few fillers, for example carbon black, can be used in polyacrylates. However, this impairs the frequently desired transparency of polyacrylates.

It is an object of the invention to provide a polymerizable composition of the type mentioned at the outset which can be used in a wide variety of ways and results in good mechanical properties of the materials which can be produced from such polymerizable compositions.

The invention accordingly provides a polymerizable composition containing:
 a. acrylates and/or methacrylates which have a glass transition temperature $T_g$ of 0° C. or less,
 b. from 0.5 to 70% by weight of $SiO_2$ particles which have an average particle size of from 1 to 150 nm and have polymerizable groups on the surface and are present in dispersed form in the acrylates and/or methacrylates, with at least 50% of the $SiO_2$ particles being individual unaggregated or unagglomerated primary particles,
 where the composition contains not more than 2% by weight of crosslinker molecules.

The polymerizable composition of the invention is based on acrylates and/or methacrylates. As filler, it contains nanosize $SiO_2$ particles which have polymerizable groups on their surface. Such polymerizable groups can, for example, be chemically bound to the surface of the $SiO_2$ particles by means of a suitable silanization. Suitable silanes are preferably selected from the group consisting of organosilanes of the formula $R^1{}_a SiX_{4-a}$, organosilanes of the formula $(R^1{}_3Si)_b NR^1{}_{3-b}$, and organosiloxanes of the formula $R^1{}_n SiO_{(4-n)/2}$, where each $R^1$ is selected independently from among hydrocarbon radicals having from 1 to 18 carbon atoms or organofunctional hydrocarbon radicals having from 1 to 18 carbon atoms or is a hydrogen atom, each X is independently a hydrolysable group, a=0, 1, 2 or 3, b=1, 2 or 3 and n is from 2 to 3 inclusive. Examples of hydrolysable groups are halogen, alkoxy, alkenoxy, acyloxy, oximino and aminoxy groups. Examples of functional, nonhydrolysable groups are vinyl, aminopropyl, chloropropyl, aminoethylaminopropyl, glycidyloxypropyl, mercaptopropyl and methacryloxypropyl groups. Suitable silanizing agents are, for example, alkoxysilanes and silazanes. Mention may be made by way of example of 3-methacryloxypropyltrimethoxysilane, 3-acryloxypropyltrimethoxysilane, 3-methacryloxypropyltriethoxysilane, phenyltrimethoxysilane, phenyltriethoxysilane, propyltrimethoxysilane, propyltriethoxysilane, 3-glycidyloxypropyltrimethoxysilane, hexamethyldisiloxane, divinyltetramethyldisiloxane, hexamethyldisilazane, divinyltetramethyldisilazane, γ-aminopropyltrimethoxysilane, γ-aminopropylmethyldiethoxysilane, γ-aminopropyldimethylmethoxysilane, chloropropyltrimethoxysilane, vinylmethyldimethoxysilane, vinyltrispropenoxysilane, vinyldimethylbutanonoximsilane, vinyltrisbutanonoximsilane, chlorotrimethylsilane, vinyldimethylchlorosilane, dimethylchlorosilane, vinymethylchlorosilane.

The polymerizable groups on the surface of the $SiO_2$ particles can comprise, in particular, vinyl groups, allyl groups, hexenyl groups, acryloyl groups and/or methacryloyl groups.

The invention has recognized that these surface-modified $SiO_2$ particles can surprisingly act as crosslinkers in the free-radical polymerization of the polymerizable composition and bring about effective crosslinking of the cured poly(meth)acrylate. For the purposes of the invention, the polymerizable composition therefore contains no or at most a small amount (not more than 2% by weight) of conventional crosslinker molecules. The term crosslinker molecules refers to low molecular weight (preferably monomeric) molecules which have at least two polymerizable double bonds and can crosslink the initially linear or branched macromolecular networks to produce three-dimensional polymeric networks. Crosslinkers are defined in Römpp Chemie-Lexikon, 10th edition, Volume 6, page 4836.

The invention makes possible an elongation at break which is substantially improved compared to conventional crosslinker molecules. When crosslinkers of the prior art are used, a tightly linked and thus relatively inextensible network is obtained. In the case of the polymerizable composition of the invention, fewer crosslinking points are obtained as a result of the surface-modified $SiO_2$ particles used but a plurality of links "from crosslinking point to crosslinking point", i.e. from particle to particle, are obtained. Such a network is extensible and nevertheless strong.

The invention makes possible, in particular, the production of an extensible and strong acrylate rubber and for this purpose uses acrylates or methacrylates having a glass transition temperature $T_g$ of 0° C. or less as starting materials for the polymerization.

For the purposes of the invention, the use of acrylates or of acrylate/methacrylate mixtures having a predominant proportion of acrylate is preferred. Acrylates are, in particular, well suited for the production of acrylate rubbers which, due to the low glass transition temperature ($T_g$<0° C.), have a rubber-like elasticity at room temperature. Butyl acrylate is particularly preferred according to the invention for producing such acrylate rubbers.

The term glass transition temperature $T_g$ refers to the glass transition temperature of the acrylates or methacrylates used in the composition of the invention after they have been polymerized. The glass transition temperatures corresponding to the homopolymers are known and are, for example, listed in J. Brandrup, E. H. Immergut, Polymer Handbook, 1st ed., J. Wiley, New York, 1975.

The glass transition temperature of a copolymer can be calculated by the Fox equation (T. G. Fox, Bull. Am. Phys. Soc. (Ser. II], 1, 123 [1956]).

The invention thus provides polymerizable compositions which, after curing, are materials having substantially improved mechanical properties. An improved elongation at break is obtained due to the surface-modified $SiO_2$ particles used, without conventional crosslinkers being necessary.

The acrylates or methacrylates preferably have from 1 to 18 carbon atoms, more preferably from 1 to 12 carbon atoms, in the alkyl chain. The alkyl chain can be linear or branched.

Preferred lower limits for the average particle size of the $SiO_2$ particles are 2 nm, 3 nm, 4 nm and 5 nm. Preferred upper limits are 100 nm, 75 nm, 50 nm, 30 nm, 25 nm and 20 nm.

The particle size can be determined in solution by means of dynamic light scattering on a "Dynamic Light Scattering Particle Size Analyzer LB-550" from Horiba at a concentration of not more than 10% by weight of particles, with the dispersion being allowed to have a maximum dynamic viscosity of 3 mPas at 25° C. The median (D50) of the particle size distribution is reported as particle size.

In the solid, the particle size can be determined by transmission electron microscopy. For this purpose, at least 100 particles are measured and a particle size distribution is constructed.

The nanosize silicon dioxide preferably comprises at least 70% of individual, unaggregated or unagglomerated primary particles in the acrylate and/or methacrylate matrix. Further preferred lower limits are 80%, 90%, 95% and 98%. These percentages are by weight. The invention thus provides a dispersion which is essentially free of aggregates and/or agglomerates of the silicon dioxide particles (colloidal dispersion). This improves the processability (lower viscosity) and the mechanical properties of intermediate and end products produced using the dispersion of the invention. Pyrogenic silicas known in the prior art have aggregation/agglomeration of the primary particles to form larger structures, which is due to the production route (flame pyrolysis) and makes the processability of intermediate and end products produced therewith difficult. The fact that the particles are present in dispersed form in the (meth)acrylate allows uniform dispersion of the particles during the polmymerization. If the particles are not present in dispersed form in the (meth)acrylate, agglomeration or heterogeneous distribution of the particles in the polymer can occur in the polymerization.

For the purposes of the invention, it is preferred that the silicon dioxide particles are monodisperse.

In one variant of the invention, at least two different polymerizable groups are located on the surface of the $SiO_2$ particles. The different polymerizable groups can preferably comprise methacryloyl, acryloyl, styryl or itaconyl groups and vinyl, allyl, alkenyl or crotonyl groups. In particular, they can comprise firstly acryloyl and/or methacryloyl groups and secondly vinyl, hexenyl and/or allyl groups.

Such a dual surface modification of the $SiO_2$ particles has the advantage that polymerizable groups having different reactivity can be applied to the particle surface. In the free-radical polymerization reaction, acryloyl or methacryloyl groups, for example, react more quickly and are thus more reactive than vinyl or in particular allyl groups. It is therefore possible, for example, firstly to allow only the methacryloyl groups on the surface of the $SiO_2$ particles to react to form crosslinks at a low temperature of, for example, 70° C. and to increase the temperature, for example, to 90° C., at a later point in the polymerization so that allyl groups present on the surface also react. As an alternative, it is possible to use different acrylate Or methacrylate monomers which have differing reactivities and are introduced in succession, with only the monomer introduced later reacting with the allyl groups.

The use of two different polymerizable groups on the particle surface and the sequential reaction with two different monomers makes it possible to form a polymer which contains two different interpenetrating polymer networks.

To produce such a dual surface modification, the corresponding silanes or siloxanes can be reacted in admixture or in succession in the silanization of the silicon dioxide particles.

Preference is given to the proportion of acryloyl and/or methacryloyl groups among the polymerizable groups on the surface being from 95 to 5% and the proportion of vinyl, hexenyl and/or allyl groups among the polymerizable groups on the surface being from 5 to 95% by weight.

The number of polymerizable groups on the surface of the $SiO_2$ particles is preferably in the range from 0.01 to 6 groups/$nm^2$, more preferably from 0.02 to 4 groups/$nm^2$. In the case of small silicon dioxide particles having, for example, a particle size of about 4 nm, preference is given to a number of polymerizable groups on the surface in the upper part of the ranges mentioned, while in the case of large $SiO_2$ particles (for example a particle size of from 20 to 30 nm), preference is given to a number of particles on the surface more towards the lower limit. Preference is given to from 10 to 4000, preferably from 10 to 2500, polymerizable groups per $SiO_2$ particle being bound to the surface.

In addition to the polymerizable groups, the particles can also bear groups which do not react in a polymerization.

The surface area of the particles can be calculated from the particle size in the case of spherical particles. The calculation is carried out using the median of the particle size distribution (D50). The specific surface area ($A_0$) can then be calculated with the aid of the density of the particle ($\rho$):

$$A_0 = 6/(\rho \times D50)$$

The density of colloidal silicon dioxide is 2.1 $g/cm^3$. The number of reactive groups per unit area ($n_R^A$) is given by the number of reactive groups ($n_R^M$) per unit mass divided by the specific surface area:

$$n_R = (n_R^M / A_0)$$

The number of reactive groups per unit mass $n_R^M$ can be determined by suitable analytical methods. If silanes of the alkoxysilane, acyloxysilane, acetoxysilane, alkenoxysilane or oximosilane are used to apply the reactive groups to the surface, complete hydrolysis of the silane can be assumed, i.e. all groups used are present on the surface of the particles.

The number of polymerizable groups on the particle surface can also be determined by NMR spectroscopy or by means of DSC (differential scanning calorimetry). These methods can, in particular, be used when suitable analytical methods for determining reactive groups (for example iodine number determination in the case of vinyl groups) are not available. In DSC, the heat of polymerization is measured as a measure of the number of polymerizable groups on the particle surface. In this DSC determination, a defined amount of the surface-modified $SiO_2$ particles is admixed with a standardized peroxide solution and the heat of reaction is measured. The method is described, for example, in DE 36 32 215 A1.

The proportion of crosslinker molecules in the polymerizable composition of the invention is preferably not more than 1% by weight, more preferably not more than 0.5% by weight, more preferably not more than 0.2% by weight. In a further preferred embodiment, no industrially relevant amounts of crosslinker molecules are present in the polymerizable composition. The crosslinking function is assumed exclusively by the surface-modified $SiO_2$ particles. However, it is also possible for the purposes of the invention to use very small amounts of preferably grafting crosslinkers such as allyl methacrylate in order to modify the network.

In a further embodiment of the invention, the proportion of oligomers and/or prepolymers, based on the total mass of the acrylates and/or methacrylates, is 20% or less. Oligomers and/or prepolymers are generally unreactive or reactive only to a limited extent and can remain as a soluble component in the polymer network after the polymerization and impair mechanical properties.

As mentioned above, one application of the invention is the production of acrylate rubbers. These have, according to the invention, particularly good mechanical properties, in particular a high elongation to break. At the same time, they are completely transparent since the nanofillers used according to the invention have no adverse effect on the transparency. To produce such acrylate rubbers, the acrylates or methacrylates used have a glass transition temperature $T_g$ of 0° C. or less.

The content of $SiO_2$ particles is preferably in the range from 4 to 50% by weight, more preferably from 5 to 30% by weight, even more preferably from 8 to 25% by weight.

The invention further provides a polymeric material which can be obtained by curing of a polymerizable composition according to the invention.

The polymerizable composition of the invention can, in a preferred embodiment, after curing (polymerization) have an elongation at break of at least 10% at a tensile force of 0.5 MPa or more and at a temperature of 50° C. above the glass transition temperature $T_g$ of the cured composition. This elongation at break is measured by a method analogous to DIN 53504/ISO 37 (S2) on a tensile testing machine from Zwick. It preferably has an elongation at break of at least 20%, more preferably at least 30%, even more preferably at least 50%, even more preferably at least 100%, at a temperature of 50° C. above the glass transition temperature $T_g$.

The production of silanized $SiO_2$ nanoparticles having polymerizable groups on the surface is already known in principle in the prior art. For example, $SiO_2$ particles can be precipitated from silica sols and subsequently silanized using organosilanes such as vinylsilanes. Such production via precipitated silicas is described, for example, in EP 0 926 170 B1.

Another possibility is described, for example, in J. Colloid Interface Sci 26: 62 (1968). This is the Stöber synthesis of such nanoparticles.

A further aspect of the invention is an impact modifier for polymers, in particular thermoplastics. Impact-modification of hard, brittle thermoplastics is usually carried out by incorporation of small elastomer particles having a grafted shell compatible with the thermoplastics. The impact-improving effect of the elastomer particles depends on the bonding of the grafted shell to the elastomer particles, the glass transition temperature $T_g$ of the elastomer particles, the size of the particles and naturally also on the toughness of the elastomer particles themselves.

The impact modifier of the invention comprises core-shell particles whose core is a cured polymerizable composition according to the defintion in Claim 14. This is therefore an elastomer reinforced according to the invention. The shell of the core-shell particle comprises an acrylate and/or methacrylate shell which is essentially free of $SiO_2$ particles and is grafted onto the core so as to make the elastomer particles compatible with the appropriate polymer, for example thermoplastic. The shell of such an impact modifier can comprise, for example, PMMA (polymethyl methacrylate).

The average particle size of the core-shell particles of an impact modifier according to the invention is preferably in the range from 0.05 to 10 µm, more preferably from 0.1 to 8 µm, even more preferably from 0.2 to 5 µm, even more preferably from 0.2 to 2 µm, even more preferably from 0.3 to 1 µm.

Examples of the invention are described below.

Firstly, the measurement methods used below will be described.

The tensile strength, the E modulus and the elongation at break were determined by a method analogous to DIN 53504/ISO 37 (S2) on a tensile testing machine from Zwick. The Shore A hardness was measured by a method analogous to DIN 53505.

The viscosity of the polymerizable compositions containing crosslinking nanoparticles was measured at 25° C. on a Brookfield viscosimeter RVDV-II+ using spindle 42 at 100 $min^{-1}$.

EXAMPLE 1

Three $SiO_2$ dispersions according to the invention in methyl methacrylate (MMA) or butyl acrylate are used.

Particles P1: 50% by Weight of Nanoparticles in Methyl Methacrylate

A colloidal silica sol (40% by weight of $SiO_2$ in water, particle size (D50) by dynamic light scattering: 25 nm, stabilized with NaOH) was stirred over an acidic ion exchanger (Amberjet 1200H, Rohm & Haas) until a pH of 2-3 had been reached. 400 g of the acidic sol were stirred with 24 g of 3-methacryloxypropyltrimethoxysilane for 3 hours. The mixture was admixed with 2000 g of isopropanol and reduced to 400 g by distillation under reduced pressure. 1500 g of methyl methacrylate and 3.2 mg of methoxyhydroquinone were added to the mixture and the mixture was distilled under reduced pressure until a clear dispersion having a solids content of 50% by weight had been obtained.

Particles P2: 37.5% by Weight of Nanoparticles in Butyl Acrylate

A colloidal silica sol (40% by weight of $SiO_2$ in water, particle size (D50) by dynamic light scattering: 25 nm, stabilized with NaOH) was stirred over an acidic ion exchanger (Amberjet 1200H, Rohm & Haas) until a pH of 2-3 had been reached. 300 g of the acidic sol were admixed with 18 g of 3-methacryloxypropyltrimethoxysilane and stirred for 2 hours. The mixture was admixed with 1800 g of isopropanol and reduced to about 350 g by distillation under reduced pressure.

1200 g of butyl acrylate and 0.32 g of methoxyhydroquinone (for stabilization) were added to the mixture and the mixture was distilled under reduced pressure until the isopropanol had been removed. A dispersion having a solids content of 37.5% by weight was obtained.

Particles P3: 38.8% by Weight of Nanoparticles in Methyl Methacrylate

Example 1 was repeated with the modifications that 4.1 mg of methoxyhydroquinone were used as stabilizer and the sol was evaporated to a solids content of 38.8% by weight.

| | |
|---|---|
| P1: | 50% by weight of nanoparticles in MMA, stabilized with about 10 ppm of methoxyhydroquinone, 3.2 methacryloyloxypropyl groups/$nm^2$ on the surface |
| P2: | 37.5% by weight of nanoparticles in butyl acrylate, stabilized with 1000 ppm of methoxyhydroquinone, 3.2 methacryloxypropyl groups/$nm^2$ on the surface |
| P3: | 38.8% by weight of nanoparticles in MMA, stabilized with about 10 ppm of methoxyhydroquinone, 3.2 methacryloyloxypropyl groups/$nm^2$ on the surface |

COMPARATIVE EXAMPLE 1

A dispersion of nanoparticles having no polymerizable groups on the surface in MMA is produced Particles P0: 38.4% of Nanoparticles in Methyl Methacrylate A colloidal silica sol (40% by weight of $SiO_2$ in water, particle size (D50) by dynamic light scattering: 25 nm, stabilized with NaOH) was stirred over an acidic ion exchanger (Amberjet 1200H, Rohm & Haas) until a pH of 2-3 had been reached. 400 g of the acidic sol were admixed with 32 g of propyltrimethoxysilane and stirred for 3 hours. The mixture was admixed with 2000 g of isopropanol and reduced to 400 g by distillation under reduced pressure. 1500 g of methyl methacrylate and 4.1 mg of methoxyhydroquinone were added to the mixture and the mixture was distilled under reduced pressure until a dispersion having a solids content of 38.4% by weight had been obtained.

| | |
|---|---|
| P0: | 38.4% by weight of nanoparticles in MMA, stabilized with about 10 ppm of methoxyhydroquinone, no methacryloyloxypropyl groups on the surface |

EXAMPLES 2 TO 7

In this Example, a casting polymer is produced using $SiO_2$ dispersions according to the invention. The external dimensions of the chamber are 150×200 mm. The make-up of the chamber in cross section is as follows:

Glass plate
Contact material (PET film or Teflon plate)
Spacing string (3 mm)
Contact material (PET film or Teflon plate)
Glass plate Hostaphan RN, thickness 350 μm (Mitsubishi Film GmbH) is used as PET film. 2 mm plates (Bohländer) are used as Teflon plates.

The polymerization is generally carried out as follows:

In Example 2, 37.6% by weight of dispersion P1 are admixed with 62.4% by weight of butyl acrylate, in Example 3 24. 8% by weight of dispersion P1 are admixed with 75.2% by weight of butyl acrylate, and in Example 4 24. 8% by weight of dispersion P2 are admixed with 54.5% by weight of butyl acrylate and 12.4% by weight of MMA. The tables below in each case report the total content of the essential constituents (nanoparticles, MMA, butyl acrylate) in the mixture.

The constituents of these formulations (nanoparticle dispersion, additional monomers and polymerization initiators) are mixed, degassed at 20 mbar and introduced at room temperature into the polymerization chamber (amount introduced: 50 g). Polymerization is subsequently carried out on a water bath firstly at 75° C. for 4 hours and subsequently at 85° C. for 2 hours. End polymerization is effected at 120° C. in an oven for 2 hours.

The starting materials used in Examples 2 to 7 are indicated in Tables 1 and 2 below. In each case, 0.1 g of didodecanoyl peroxide and 0.1 g of t-butyl perbenzoate are additionally added as polymerization initiator. The total mass of each batch in the following tables is 50 g.

TABLE 1

Synthesis of acrylic rubber plates by crosslinking of MMA/butyl acrylate mixtures by means of $SiO_2$ nanoparticles bearing methacryloyloxypropyl groups (all amounts in % by weight)

| Example | MMA | Butyl acrylate | Nanoparticles | Contact film | Appearance of the plates |
|---|---|---|---|---|---|
| 2 | 18.8 | 62.4 | 18.8 from P1 | PET | Colourless, tack-free |
| 3 | 12.4 | 75.2 | 12.4 from P1 | PET | Colourless, flexible, virtually tack-free |
| 4 | 12.4 | 75.2 | 12.4 from P2 | Teflon | Yellow, cloudy, tack-free |
| 5C | 12.4 | 86.5 + 1.1 of TMPTA | — | Teflon | Colourless, flexible, sticky |

TMPTA: Trimethylolpropane triacrylate

TABLE 2

Acrylic rubber plates by the casting process using 0.1% by weight of allyl methacrylate as grafted crosslinker

| Example | MMA | Butyl acrylate | Nanoparticles | Contact film | Appearance of the plates |
|---|---|---|---|---|---|
| 6 | 12.4 | 79.8[1)] | 20.3 from P3 | PET | Colourless, transparent |
| 7C | 12.4 | 79.8[1)] | 20.3 from P0 | PET | Colourless, transparent[2)] |

[1)]Additionally present: 0.1% by weight of allyl methacrylate
[2)]Plate could not be removed from the PET film without being destroyed Examples 5C and 7C are comparative examples. In Example 5C, no nanoparticles at all are used, while in Example 7C the nanoparticles P0 which have not been modified according to the invention are used.

The cast polymer plates produced are (if possible) removed from the polymerization chamber and the mechanical properties are tested. The results are shown in Table 3 below.

TABLE 3

Characterization in respect of hardness and tensile properties

| Example | Shore A | F-max (MPa) | ϵ-max (%) | E modulus MPa |
|---|---|---|---|---|
| 2 | 34 | 2.92 | 231 | 1.21 |
| 3 | 20 | 1.41 | 287 | 0.27 |
| 4 | 24 | 0.86 | 178 | 0.34 |
| 5C | 24 | 0.28 | 82 | |
| 6 | 16 | 0.99 | 346 | 0.12 |
| 7C | — | — | — | —[1)] |

1) Plate could not be separated from the PET film

EXAMPLE 8

Production of an Impact Modifier

An organic phase consisting of:
0.222 g of didodecanoyl peroxide 20.0 g of butyl acrylate
10.0 g of P1
is admixed with an aqueous phase composed of 0.15 g of Statexan K30 (C14-alkanesulphonic acid Na salt) and 26.3 g of water and emulsified at 20 000 rpm for 10 s (T25 basic ULTRA-TURRAX). A stable, fine emulsion (droplets <1 μm) is obtained.

0.05 g of Statexan K30 in 118 g of water are placed in a Witt pot: 250 ml, NW 60, provided with glass blade stirrer. After addition of the abovementioned, fine emulsion, the mixture is heated to 80° C. (bath temperature) under argon as protective gas while stirring slowly (about 100 min$^{-1}$). After stirring for 90 minutes at 80° C., the mixture is cooled. This gives a coagulum-free dispersion: particle size <1 μm, solids content 15.5%.

Evaporation of the water gives the solid polymer. The flexible, elastic solid obtained in this way can be dispersed in methyl methacrylate. The microparticles are crosslinked. They can be used as impact modifier.

The invention claimed is:

1. A polymerizable composition comprising:
   a) acrylates and/or methacrylates which have a glass transition temperature $T_g$ of 0° C. or less,
   b) from 0.5 to 70% by weight of SiO$_2$ particles which have an average particle size of from 1 to 150 nm and have polymerizable groups on the surface and are present in dispersed form in the acrylates and/or methacrylates, with at least 50% of the SiO$_2$ particles being individual, unaggregated or unagglomerated primary particles,
   c) not more than 2% by weight of crosslinker molecules.

2. The polymerizable composition according to claim 1, wherein the average particle size of the SiO$_2$ particles is from 2 to 100 nm.

3. The polymerizable composition according to claim 1, wherein the average particle size of the SiO$_2$ particles is from 3 to 75 nm.

4. The polymerizable composition according to claim 1, wherein the average particle size of the SiO$_2$ particles is from 4 to 50 nm.

5. The polymerizable composition according to claim 1, wherein the average particle size of the SiO$_2$ particles is from 5 to 30 nm.

6. The polymerizable composition according to claim 1, wherein the average particle size of the SiO$_2$ particles is not more than 25 nm.

7. The polymerizable composition according to claim 1, wherein the average particle size of the SiO$_2$ particles is not more than 20 nm.

8. The polymerizable composition according to claim 1, wherein at least 70% of the SiO$_2$ particles are individual, unaggregated or unagglomerated primary particles.

9. The polymerizable composition according to claim 1, wherein at least 80% of the SiO$_2$ particles are individual, unaggregated or unagglomerated primary particles.

10. The polymerizable composition according to claim 1, wherein at least 90% of the SiO$_2$ particles are individual, unaggregated or unagglomerated primary particles.

11. The polymerizable composition according to claim 1, wherein the acrylate is butyl acrylate.

12. The polymerizable composition according to claim 1, wherein the polymerizable groups on the surface of the SiO$_2$ particles comprise methacryloyl, acryloyl, styryl, itaconyl, crotonyl, vinyl, allyl and/or alkenyl groups.

13. The polymerizable composition according to claim 1, wherein at least two different polymerizable groups are present on the surface of the SiO$_2$ particles.

14. The polymerizable composition according to claim 13, wherein the at least two different polymerizable groups comprise a first polymerizable group selected from methacryloyl, acryloyl, styryl or itaconyl groups, and a second polymerizable group selected from vinyl, allyl, alkenyl or crotonyl groups.

15. The polymerizable composition according to claim 14, wherein a proportion of methacryloyl, acryloyl, styryl or itaconyl groups among the polymerizable groups on the surface is from 95 to 5% and a proportion of the vinyl, allyl, alkenyl or crotonyl groups among the polymerizable groups on the surface is from 5 to 95%.

16. The polymerizable composition according to claim 1, wherein the surface of the SiO$_2$ particles has from 0.01 to 6 polymerizable groups per nm$^2$.

17. The polymerizable composition according to claim 1, wherein the surface of the SiO$_2$ particles has from 0.02 to 4 polymerizable groups per nm$^2$.

18. The polymerizable composition according to claim 1, wherein a proportion of crosslinker molecules is not more than 1% by weight.

19. The polymerizable composition according to claim 1, wherein a proportion of crosslinker molecules is not more than 0.5% by weight.

20. The polymerizable composition according to claim 1, wherein a proportion of crosslinker molecules is not more than 0.2% by weight.

21. The polymerizable composition according to claim 1, further comprising oligomers and/or prepolymers, wherein the proportion of the oligomers and/or prepolymers, based on a total mass of the acrylates and/or methacrylates, is 20% by weight or less.

22. The polymerizable composition according to claim 1, wherein the content of SiO$_2$ particles is from 4 to 50% by weight.

23. The polymerizable composition according to claim 1, wherein the SiO$_2$ particles is from 5 to 30% by weight.

24. The polymerizable composition according to claim 1, wherein the content of SiO$_2$ particles is from 8 to 25% by weight.

25. A composition comprising a polymeric material obtained by curing the polymerizable composition according to claim 1.

26. The composition according to claim 25, wherein the polymeric material is a cast polymer or an acrylate rubber.

27. The composition according to claim 25, wherein at a temperature of 50° C. above the glass transition temperature $T_g$ said composition has an elongation at break at a tensile force $F_{max}$ of 0.5 MPa or more of at least 20%.

28. The composition according to claim 25, wherein at a temperature of 50° C. above the glass transition temperature $T_g$ said composition has an elongation at break at a tensile force $F_{max}$ of 0.5 MPa or more of at least 30%.

29. The composition according to claim 25, wherein at a temperature of 50° C. above the glass transition temperature $T_g$ said composition has an elongation at break at a tensile force $F_{max}$ of 0.5 MPa or more of at least 50%.

30. The compositoin according to claim 25, wherein at a temperature of 50° C. above the glass transition temperature $T_g$ said composition has an elongation at break at a tensile force $F_{max}$ of 0.5 MPa or more of at least 100%.

31. A composition comprising an impact modifier for polymers, said impact modifier comprising core-shell particles wherein the core comprises a cured polymerizable composition according to claim 1, and wherein the shell comprises an acrylate and/or methacrylate shell which is essentially free of SiO$_2$ particles and is grafted onto the core.

32. The composition of claim 31, wherein the shell comprises PMMA.

33. The composition according to claim 31, wherein an average particle size of the core-shell particles is from 0.05 to 10 μm.

34. The composition according to claim 31, wherein an average particle size of the core-shell particles is from 0.1 to 8 μm.

35. The composition according to claim 31, wherein an average particle size of the core-shell particles is from 0.2 to 5 μm.

36. The composition according to claim 31, wherein an average particle size of the core-shell particles is from 0.2 to 2 μm.

37. The composition according to claim 31, wherein an average particle size of the core-shell particles is from 0.3 to 1 μm.

* * * * *

UNITED STATES PATENT AND TRADEMARK OFFICE
CERTIFICATE OF CORRECTION

PATENT NO.       : 8,466,245 B2
APPLICATION NO. : 12/988260
DATED            : June 18, 2013
INVENTOR(S)      : Langerbeins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 298 days.

Signed and Sealed this
Eighth Day of September, 2015

Michelle K. Lee
*Director of the United States Patent and Trademark Office*